United States Patent [19]

Miller et al.

[11] Patent Number: 5,375,181
[45] Date of Patent: Dec. 20, 1994

[54] TEMPERATURE COMPENSATED FIBER FABRY-PEROT FILTERS

[75] Inventors: Calvin M. Miller, Atlanta; Jeffrey W. Miller, Smyrna, both of Ga.

[73] Assignee: Micron Optics, Inc., Atlanta, Ga.

[21] Appl. No.: 135,679

[22] Filed: Oct. 13, 1993

Related U.S. Application Data

[63] Continuation-in-part of Ser. No. 929,836, Aug. 12, 1992, Pat. No. 5,289,552.

[51] Int. Cl.⁵ .................................................. G02B 6/38
[52] U.S. Cl. .......................................... 385/27; 385/72; 385/73; 356/352
[58] Field of Search .................... 385/27, 31, 73, 50, 385/72; 356/352

[56] References Cited

U.S. PATENT DOCUMENTS

| | | | |
|---|---|---|---|
| 4,545,644 | 10/1985 | DeVeau, Jr. et al. | 385/64 |
| 4,813,756 | 3/1989 | Frenkel et al. | 385/73 |
| 4,830,451 | 5/1989 | Stone | 385/31 |
| 4,861,136 | 8/1989 | Stone et al. | 385/27 |
| 4,923,273 | 5/1990 | Taylor | 385/48 |
| 5,062,684 | 11/1991 | Clayton et al. | 385/27 |
| 5,073,004 | 12/1991 | Clayton et al. | 385/27 |
| 5,212,745 | 5/1993 | Miller | 385/25 |
| 5,212,746 | 5/1993 | Miller et al. | 385/25 |

FOREIGN PATENT DOCUMENTS

| | | | |
|---|---|---|---|
| 0457484 | 5/1991 | European Pat. Off. | G02B 6/26 |
| 0437963 | 12/1991 | European Pat. Off. | G01J 3/26 |

OTHER PUBLICATIONS

Miller et al. *Elect. Lett.* 26(25): 2122–2123, 6 Dec. 1990.
Stone et al. *Elect. Lett.* 23(15): 781–783, 16 Jul. 1987.

*Primary Examiner*—Frank Gonzalez
*Attorney, Agent, or Firm*—Greenlee and Winner

[57] ABSTRACT

Temperature compensated Fiber Fabry Perot filters are provided. These filters display minimal wavelength drift over a wide range of temperatures. The temperature coefficients of the filters can be adjusted after construction. These FFPs are particularly useful in applications in which filter size is a constraint. The disclosed filter designs can be employed for minaturized filters which retain thermal and optical stability over a wide range of temperatures. In particular, low-loss thermally stable FFPs suitable for use in circuit board applications are provided.

25 Claims, 6 Drawing Sheets

TEMPERATURE COMPENSATED FIBER FABRY-PEROT FILTERS

This application is a continuation-in-part of U.S. patent application Ser. No. 07/929,836, filed Aug. 12, 1992, now U.S. Pat. No. 5,289,552 issued on Feb. 22, 1994, which is incorporated in its entirety by reference herein.

FIELD OF THE INVENTION

This invention is in the field of fiber optics and relates specifically to means for temperature compensation of optical fiber filters.

BACKGROUND OF THE INVENTION

Transmission of information by the use of light over optical fibers is widely used in long-haul telecommunication systems. Optical signals are generated, transported along optical fibers and detected to regenerate the original electronic signal with as little change as possible. Fibers are substituted for other transmission media and all signal processing is done electronically, resulting in lowered cost and high quality digital transmission.

As fiber optic applications technology develops direct optical processing of signals without conversion to electronic signals will be required. Optical fiber systems will be applied in computer networks, for example, in multiple access computer networks. Such applications will require optical fiber devices such as amplifiers, multiplex/demultiplexes, splitters, couplers, filters, equalizers, switches and other optical signal processors.

An economical low-loss, easily and reproducibly manufactured single-mode optical fiber filter, the design of which can be adapted to a desired bandwidth, FSR and finesse is an important component for such fiber optic systems. A fiber Fabry-Perot (FFP) interferometric filter is such a component.

The Fabry-Perot (FP) Interferometer was first described by C. Fabry and A. Perot in 1897 (Ann. Chem. Phys., 12:459–501) and has since found wide use in a variety of applications of optical filters. The basic structure and operation of the FP interferometer is well-known in the art and is described in many physics and optics texts (see, for example, E. Hecht "Optics" 2nd. Edition (1987) Addison-Wesley, Reading, Mass., p. 369). This interferometer consists of an optical cavity formed between two typically highly reflecting, low-loss, partially transmitting mirrors. Lenses are typically used to collimate divergent optical beams for processing through the FP interferometer.

While single-mode optical fibers can be used with lensed conventional FP interferometers, lenses with large beam expansion ratios are required and result in reduced stability and poor optical performance. The adaptation of FP cavities for optical fiber filters had been hindered by the lack of practical designs for FFPs with appropriate optical properties. Recently, FFPs which possess optical properties suitable for telecommunication applications have been described. These FFPs consist of two highly reflective, preferably plane-parallel mirrors, forming the optical cavity through at least a portion of which, in most cases, a length of single-mode optical fiber extends. This basic design eliminates the need for collimating and focusing lenses, improves stability and optical performance and makes the FFPs compatible with single-mode optical fibers and other fiber devices.

The transmission characteristics of a typical FFP of length, $l_c$ have been described previously, for example see U.S. Pat. No. 5,289,552. The fractional transmitted power, $I_t/I_{in}$, through the optical cavity is $$I(f) = \frac{k}{1 + \left(\frac{2F}{\pi} \sin[2\pi n l_c/\lambda]\right)^2} \quad (1)$$

where $l_c$ is the cavity length which is the length of single-mode optical fiber and any fiber gaps or spacing between the mirrors which form the cavity, n is the index of refraction of the cavity material, F is the finesse of the cavity and k is the insertional loss. For the lossless case, k is 1 and the ideal F is dependent only on the reflectivities of the mirrors (R, where the reflectivities of the mirrors are assumed to be equal) and $$F = \frac{\pi \sqrt{R}}{(1 - R)} \quad (2)$$

For a fixed value of n, when $n l_c = m\lambda/2$, where m is an integer, equation 1 has maxima corresponding to a resonance condition within the cavity. Incident light with $\lambda$ that is an integer multiple of the cavity optical path length ($nl_c$) is transmitted with little attenuation. Incident light of other wavelengths is highly attenuated. For a given m, changing $l_c$ or $\lambda$ results in a shift of all transmission maxima. Insertion loss is the minimum loss through the FFP and is equal to $-10 \log k$ or $-10 \log (I_1/I_{in})$. The difference between the frequencies of the resonance peaks, for constant $l_c$ and $\lambda$, is the free spectral range (FSR)=$c/2nl_c$, where $c=3\times10^8$ m/s. An FFP is tuned between successive resonance maxima by, for example, changing $l_c$. (Alternatively, tuning of the FFP can be accomplished by changing n.) The bandwidth (BW) is the full width at half maximum. The finesse of the filter, F=FSR/BW, can be measured experimentally by measuring the ratio of FSR to BW from the transmission curves generated by varying $l_c$ with constant $\lambda$. Measuring F in this manner accounts for all non-dispersive losses including mirror absorption, diffraction and alignment losses. If $\lambda$ is varied to generate transmission curves, dispersive properties of the mirrors, fibers, and cavity modes are also included in the measured FSR.

In 1987, J. Stone and L. W. Stulz described three configurations of FFP interferometric filters (Elect. Lett., 23(15):781–783, 1987) that span a wide spectrum of bandwidths and tuning ranges. The Type I FFP is a long cavity FFP in which mirrors are deposited at the ends of a continuous fiber. In this FFP, the fiber can be stretched by piezoelectric transducers (PZTs) to produce tuning of the bandwidth (BW) over the free spectral range (FSR).

The Type II FFP of Stone and Stulz is a gap resonator which has no optical fiber inside the optical cavity and so can exhibit significant losses. Due to such losses, the useful cavity length of this type of FFP is less than about 5 μm.

The Type III FFP is better suited to telecommunication applications than either of the other types of FFPs. It has an internal waveguide interposed between external fiber ends. Mirrors are positioned at an external fiber end and at one end of the waveguide. The waveguide is comprised within the optical cavity. The optical cavity also contains a fiber gap, for example between the waveguide and one of the external fiber ends, the width of which is fixed or can be changed to tune the filter.

The ferrule components and waveguide of Type II and III FFPs must be axially aligned to high precision in order to minimize transmission loss. Type II and III FFPs are the subject of U.S. Pat. No. 4,861,136. This patent relates to FFPs which are tuned by use of PZTs to change the cavity length. In order to use PZTs to change resonance cavity length without detriment to alignment, elaborate alignment brackets and fixtures are necessary.

U.S. Pat. No. 5,062,684 describes an improved tunable FFP filter in which the resonance cavity is formed by two wafered ferrules with mirrors embedded between the wafer and the ferrule and axially disposed optical fibers. The two ferrules are positioned in the filter configuration with mirrors opposed and the optical fibers of the ferrules aligned. The resonance cavity formed between the embedded mirrors contains a fiber gap between the wafered ends of the ferrules. The ferrule combination is held in alignment by an alignment fixture including piezoelectric transducers which function to change the resonance cavity length on application of a voltage to the transducer. A support fixture useful for holding a FFP ferrule assembly in axial alignment is described in EP patent application 0 457 484. This fixture also provides PZTs for changing the cavity length and means for minor adjustment of alignment.

A major problem of FFP filters is signal loss due to wavelength drift as a function of the change in cavity length of the filter with temperature and insertional loss. An uncompensated FFP, like that of U.S. Pat. No. 5,062,684 or EP application 457,484, can exhibit a relatively large change in cavity length, of the order 0.05 $\mu$m/°C. This can represent a drift of a full FSR (free spectral range) over 15° C. See C. M. Miller and F. J. Janniello (1990) Electronics Letters 26:2122–2123.

Control circuitry has been employed with PZT-tuned FFPs to lock the filter onto a wavelength over a wide temperature range (I. P. Kaminow (1987) Electronics Letters 23:1102–1103 and D. A. Fishman et al. (1990) Photonics Technology Letters pp.662–664). In these systems, control voltage swings of several tens of volts were required to compensate for the relatively large change in cavity length with temperature. Wavelength locking of FFP filters can prevent signal loss, however since approximately 20 volts applied to a PZT is needed to tune through an FSR, a total power supply range of about 60 volts is needed to maintain the wavelength lock over an operationally useful temperature range of about 30° C. (Fishman et al. supra).

Miller and Janniello (1990) supra described passive temperature compensation of PZT-tuned FFPs. Since PZTs require a higher voltage at higher temperature to maintain a given length, cavity length effectively decreases with increasing temperature (with constant voltage). Thus, the PZT-tuned FFP has a negative temperature coefficient. Addition of a material having a positive temperature coefficient in series with the PZTs, for example aluminum blocks, was found to compensate for the negative temperature coefficient of the PZTs. This method of passive compensation significantly reduced the voltage requirements for FFP locking circuits such that ±12 volt power supplies, such as are conventionally employed in computer systems, could be employed for locking.

The production yield of highly accurate, passively compensated FFPs has been low. This is due in part to the fact that it is difficult to obtain the required degree of passive temperature compensation in any particular filter. The filter assembly must be entirely constructed before the extent of compensation achieved can be tested. With such passive compensation there is no means for adjusting the temperature coefficient of the filter after the filter has been fabricated. FFPs are often over or under compensated.

The present invention provides FFPs which overcome the difficulties described above. In the filters of this invention, the temperature coefficient can be selectively varied after fabrication of the filter in order to minimize the variation of the cavity length as a function of temperature. The filter holders and methods described herein provide FFPs which on average have a significantly lower temperature coefficient than previously described temperature compensated FFPs.

The FFPs of this invention can be miniaturized for use in applications in which device size is a concern. FFPs having dimensions of less than about 6.8 mm in height, 10 mm in width and 30 mm in length, in particular, miniaturized FFPs of this invention can be used in circuit broad applications. Circuit board spacing limits the height of circuit board components to about 6.8 mm. Miniaturized FFPs of this invention retain excellent thermal properties. Miniaturized FFPs which display wavelength drift less than 1 FSR/100° C. (−25° C. to 75° C.) and less than 1 dB insertion loss over the same temperature range have been constructed.

Application of the FFP designs and methods herein for filter fabrication and the use of the ferrule holders herein result in significantly improved manufacturing yield of FFPs having desirable optical characteristics and low thermal coefficients.

SUMMARY OF THE INVENTION

It is an object of this invention to provide temperature compensated fiber Fabry-Perot filters (FFPs) that are stable to wavelength drift over a useful range of device operating temperatures (e.g., from about −25°–75° C.). Means for adjusting the temperature coefficient of an FFP are provided. Preferred filters have a wavelength drift less than or equal to 1 FSR/100° C. It is also an object of this invention to provide temperature compensated filters that can be miniaturized to meet demands for compact optical components useful, for example in circuit board applications. Miniaturized FFPs of this invention are less than or equal to 6.8 mm in height, less than or equal to 10 mm in width and less than or equal to about 30 mm in length. Preferred miniaturized FFPs retain desirable thermal characteristics.

The cavity length temperature coefficients of the FFPs of this invention can be adjusted after the filter has been constructed, not merely by choice of filter components. In particular, FFPs are provided which have a means for further fine adjustment of temperature coefficient in a passively temperature compensated FFP filter. The use of the designs, methods and components of this invention results in significant improvement in production yield of FFPs with desired optical and thermal characteristics.

In the furtherance of these objects this invention provides temperature compensated FFPs comprising ferrule holders which incorporate means for adjusting the temperature coefficient of FFPs. These holders optionally incorporate means for adjusting the alignment of the optical fibers of the FFP. The ferrule holders of this invention can be employed for production of miniaturized temperature compensated FFPs employing components that are presently commercially available. The FFPs of this invention further provide low-loss operation over a wide range of temperatures.

Other objects and aspects of this invention will be readily apparent those of ordinary skill in the art upon consideration of the following drawings and descriptions.

DETAILED DESCRIPTION OF THE INVENTION

Figure 1:
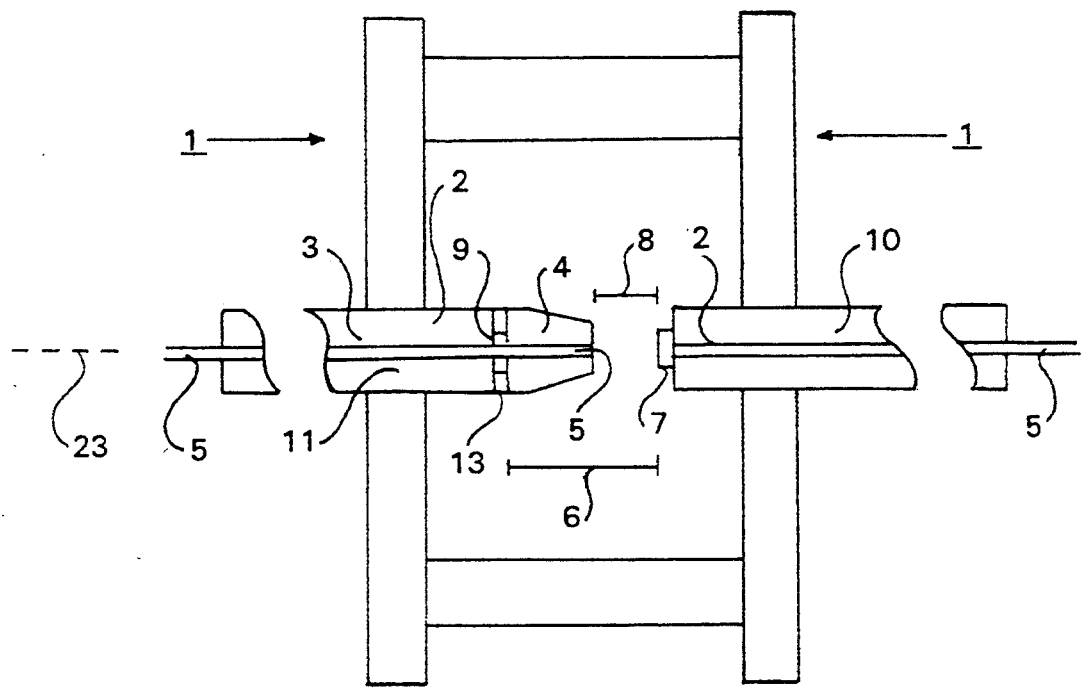
FIG. 1 is a schematic representation of a tunable FFP filter.

FIG. 1 schematically shows a typical FFP filter configuration (100) with two ferrules (10 and 11) aligned within a supporting fixture (1). Each ferrule contains a substantially axial bore (2) along a longitudinal axis (23) for receiving an optical fiber (5). The FFP shown contains a wafered ferrule (11) in combination with a mirror-ended ferrule (10). The wafered ferrule has a mirror (9) embedded between the ferrule (3) and the wafer (4). The axial optical fibers of the wafer and the ferrule are aligned and the two elements are bonded with epoxy (13). The embedded mirror (9) and the mirror (7) deposited at the end of ferrule (10) form the resonance cavity of the FFP filter, indicated by 6. In the FFP exemplified in FIG. 1, there is a small gap in the optical fiber (8) within the resonance cavity. The length of this gap can be varied to tune the wavelength transmitted through the filter. The optical fibers of the ferrules of the FFP are aligned so that an optical signal can traverse the filter. The FFP ferrule assembly of FIG. 1 has been described in U.S. Pat. No. 5,212,746. Alternative FFP ferrule assemblies having a fiber gap within the resonance cavity include FFPs having two mirror-ended ferrules or two wafered ferrules with embedded mirrors. FFP filters can also have a continuous fiber throughout the resonance cavity. In a FFP having a continuous fiber, the filter can be tuned by stretching the fiber. The characteristics and applications of various fiber ferrule configurations for FFPs have been discussed in U.S. Pat. Nos. 5,212,746, 5,062,684, and 4,861,136 which are incorporated by reference in their entirety herein. These various fiber ferrule configurations can be employed in the FFPs of this invention.

The present invention particularly relates to temperature compensation of FFPs in which the cavity length is changed, for example, by fiber stretching or by changing the length of a fiber gap. Temperature compensation minimizes the effect of ambient temperature changes on cavity length. For tunable operation, the means used for alignment of an FFP must retain high precision alignment but allow longitudinal variation in the cavity length so that the filter can be tuned. One solution to these exacting requirements has been the combination of high precision brackets with a means for electronically stretching the resonance cavity. However, these FFPs can display significant variation in cavity length as a function of temperature which results in significant wavelength drift as a function of temperature. For an FFP, a cavity length thermal coefficient, $\alpha_{lc}$, reflecting the change in cavity length/C° can be defined in terms of the change in wavelength (e.g., as a percent of an FSR) with temperature. The larger this coefficient is, the greater is the change in cavity length exhibited by the FFP with temperature. A negative coefficient, as is conventional, indicates that cavity length will decrease with increasing temperature. Prior art FFPs without temperature compensation have cavity length temperature coefficients in the range of 1 FSR/15° C. For stacked PZTs, which are typically employed in FFPs, a higher voltage is required at higher temperatures to achieve the same change in length. Stacked PZTs thus effectively have a large negative temperature coefficient. A filter which varies by a FSR over such a small temperature range is not very useful for applications over a typical range of device operating temperatures (i.e., about 0°-75° C).

Wavelength locking techniques (Miller and Janniello (1990) supra) can prevent significant signal loss from wavelength drift with temperature, but high voltage power supplies, i.e., ±60 volts, are required to achieve wavelength control over a minimally reasonable temperature range of 60° C.

Passive temperature compensation can be employed to reduce the voltage requirements of FFP locking circuits and expand the useful temperature range for an FFP filter. Passive temperature compensation of a filter has been achieved by connecting a material having a positive temperature coefficient to balance the negative temperature coefficient of the PZT. For example, an aluminum block can be bonded with epoxy in series with the PZT within the brackets of an FFP support.

While wavelength drift can be reduced significantly by this method, a significant variation in wavelength drift was nevertheless observed from filter to filter. U.S. Pat. No. 5,289,552 described the use of controlled layers of adhesives in the construction of FFPs to improve temperature compensation. The amount and type of epoxy employed significantly affect the temperature coefficient of the FFP. Epoxys that are appropriate for use in bonding a PZT have a very high positive temperature coefficient, so that even small variations in the amount of epoxy used in the construction of FFPs lead to significant variation in their temperature coefficients. The thickness of the epoxy layer, i.e. the amount of epoxy, used in joints between parts of the filter must thus be precisely controlled. It was found that the temperature coefficients of epoxys are so high that it is possible to approximately balance the negative temperature coefficient effect of the PZTs by eliminating the aluminum blocks and simply using a controlled amount of epoxy in the joints between the support brackets and the PZTs.

U.S. Pat. No. 5,289,552 also described FFPs having an adjustable means for changing the filter's temperature coefficient. This adjustment was provided by a means for changing the points of contact between the glass ferrule and the ferrule support body. In these FFPs, the PZTs were bonded between brackets extending outwardly from the longitudinal axis of the alignment fixture. The brackets which coincide with the ends of the PZTs defined an inboard and outboard section of the filter and corresponding inboard and outboard sections of each filter support. The ferrule support had means in both its inboard and outboard sections for making a rigid contact between the support and the ferrule in the support. A series of screws along the longitudinal length of the support was specifically employed. Changing these points of contact effectively increased or decreased the amount of positive temperature coefficient material which contributed to the cavity length temperature coefficient. Dependent upon the materials employed in the filter, changing the contact points allowed adjustment over a range of about ±0.2 FSR/15° C.

The FFPs of this invention are an extension of and an improvement over the FFPs of U.S. Pat. No. 5,289,552. In particular, it was found that the FFPs of the prior application could not be miniaturized significant detriment to temperature compensation, optical characteristics and most importantly to the mechanical stability of the FFPs. In miniaturized FFPs the screws used to hold ferrules within their supports must be reduced significantly in size and must be spaced closely along the support. With such small screw sizes, the force applied on tightening is concentrated on the ferrule glass and the glass can fracture. Ferrule breakage was also observed to increase as the temperature of the FFPs was varied. The FFPs of this invention overcome the problem of ferrule breakage and unexpectedly provide for finer adjustment of the temperature coefficient of the filter in the range of 0.1 or 0.2 FSR/screw.

FFPs of this invention comprise a fiber ferrule assembly of two ferrules in which an optical resonance cavity is formed as in FIG. 1. Each ferrule has a mirror which is transverse to its longitudinal axis at an optical fiber end. The optical cavity is formed between two opposed reflective surfaces of the mirrors of two ferrules. The optical cavity contains an optically continuous fiber which may or may not contain a fiber gap. Each ferrule is inserted into a essentially cylindrical passage way in a ferrule holder.

Figure 2:
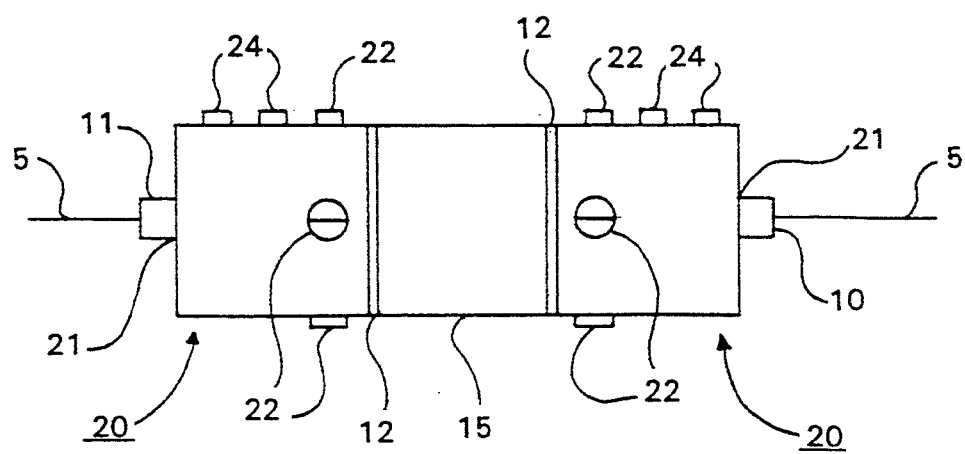
FIG. 2 is a schematic representation of a temperature compensated FFP of this invention in which two ferrule holders are connected to a cylindrical PZT. The ferrule holders of the exemplified FFP have one set of four screws for alignment and a series of screws in line along the length of the holder to provide temperature compensation.
Figure 4:
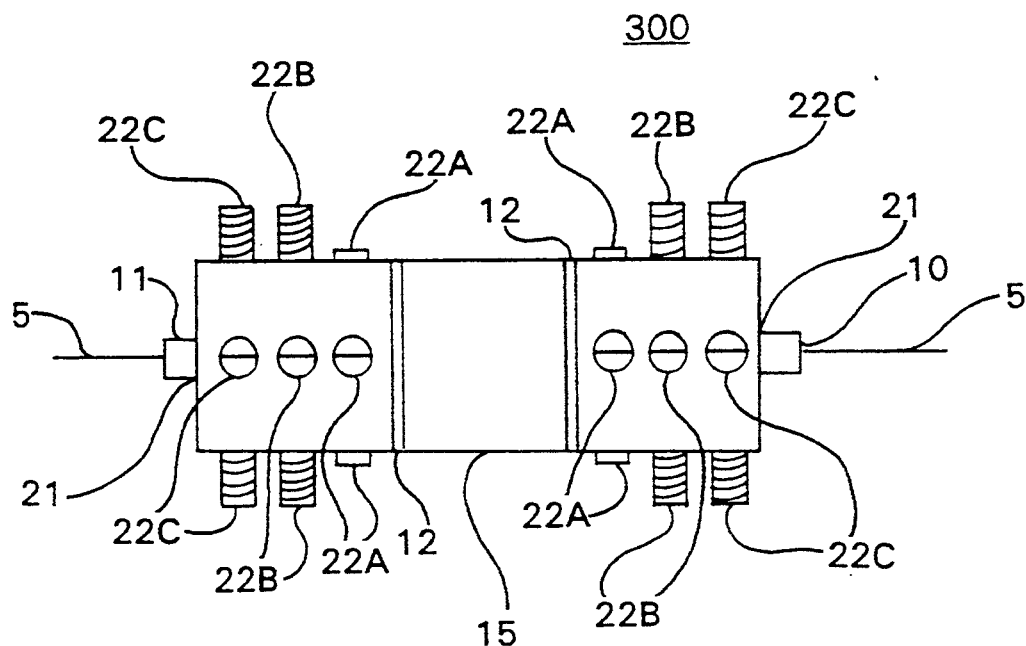
FIG. 4 is a schematic representation of a second FFP of this invention having three sets of four screw holes in each ferrule holder which provide adjustment of alignment and temperature compensation.

The body of the FFP is formed by rigidly bonding one end of each of two ferrule holders (the internal end) to the opposite ends of a PZT as shown in FIGS. 2 and 4. The PZTs employed have an essentially cylindrical passageway along its elongation axis the diameter of which is larger than the diameter of the ferrule. The ferrule holders are bonded to the PZT such that the passageways of the holders and PZT are aligned forming a passageway through the FFP.

The ferrule holders in combination with the PZT comprise a support for the ferrules in which the optical cavity is formed and which allows the length of the optical cavity to be changed. Each of the ferrule holders has a plurality of adjustable means along the length of the holder passageway for effecting a contact point between the ferrule and the body of the holder. The adjustable means are exemplified by screws which extend through the body of the holder and enter the passageway. The screws do not make a direct contact with the glass ferrule in the holder. A sleeve is inserted in each holder around the circumference of the ferrule. The screws contact the sleeve which in turn contacts the ferrule to secure it within the holder. The screws in the holder function to adjust the temperature coefficient of the FFP after it is constructed. The screws can also function to adjust alignment of the optical fiber in the filter.

The sleeve is employed to distribute the load on the glass due to tightening the screws. A phosphor bronze sleeve of the type typically used in fiber optic connectors was initially employed. The use of the sleeve in the FFPs of this invention significantly decreases ferrule breakage, particularly in miniaturized configurations.

It was found that the use of the sleeve provided an unexpected advantage for temperature compensation since finer adjustment of the temperature coefficient was possible. The interposition of the bronze sleeve functions to reduce the effect of each screw change on the overall temperature coefficient of the filter. This effect is believed to be attributable in part to the significantly higher positive temperature coefficient of bronze ($19 \times 10^{-6}$/°C.) compared to that of stainless steel ($10.3 \times 10^{-6}$/°C.) used in the holder. Metals having similarly high positive temperature coefficients and suitable mechanical properties can be employed as sleeves in the FFPs of this invention.

Details of the construction of FFPs of this invention are provided by reference to FIGS. 2-7.

FIG. 2 is a schematic representation of a temperature compensated FFP 200 of this invention. Two ferrule holders (20) are connected to a PZT (15) using controlled thickness epoxy layers (12). The ferrule holders of FFP 200 have one set of four screws (22) for alignment and a series of screws (24) in line along the length of the holder to provide temperature compensation. The screws also function to secure the ferrules (10 and 11) within the holder passageway. Screws 24 are adjusted to achieve desired alignment. The remaining screws 22 are tightened or loosened as necessary to achieve a desired temperature compensation.

Figure 3:
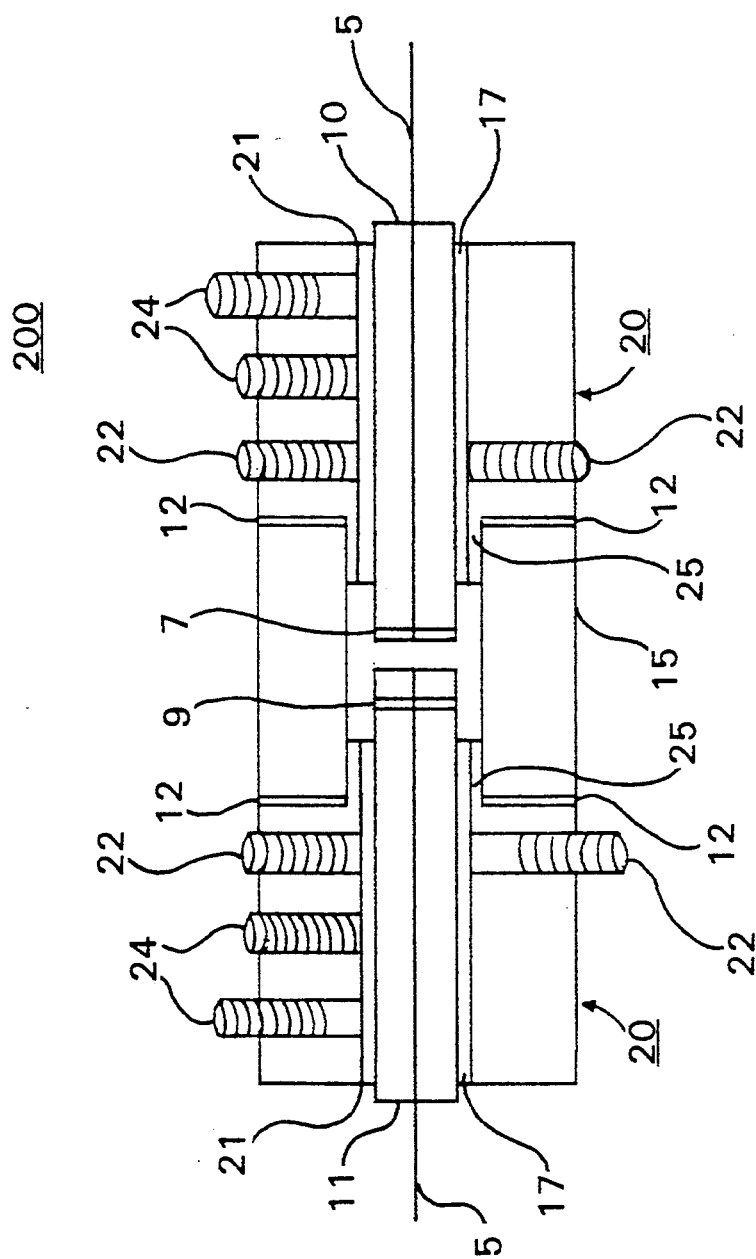
FIG. 3 is a schematic cross-sectional view of the FFP of FIG. 2.

FIG. 3 is a cross-sectional view of FFP 200 and shows the position of the ferrule assembly within the filter. In this case, a wafered ferrule (11) is combined with a mirror-ended ferrule (10) to form the optical cavity. The sleeve 17 is interposed in the passageway (21) of the holder such that the screws 22 and 24 contact the sleeve which in turn contacts the ferrule. The internal end of the holder is bonded to the end of the single cylindrical PZT (15) and the passageways in the PZT and the holders are aligned so that the internal ends of the ferrules can be inserted into the holders and extend into the PZT. Application of an electric field across the causes it to elongate longitudinally and thereby increase the optical cavity length. The internal end of each holder has a flange (25) around the circumference of the internal exit of the holder passageway. This flange is designed to fit inside the passageway of the PZT to keep adhesive out of the optical cavity. Epoxy thickness (12) is controlled by the use of gauge wires as described in detail below.

FIG. 4 is a schematic representation of a second FFP of this invention 300, similar to FFP 200 but having three sets of four screw holes 22A, 22B and 22C equiangularly distributed around the circumference of the holder passageway in each ferrule holder which provide adjustment of alignment and temperature compensation.

Figure 5:
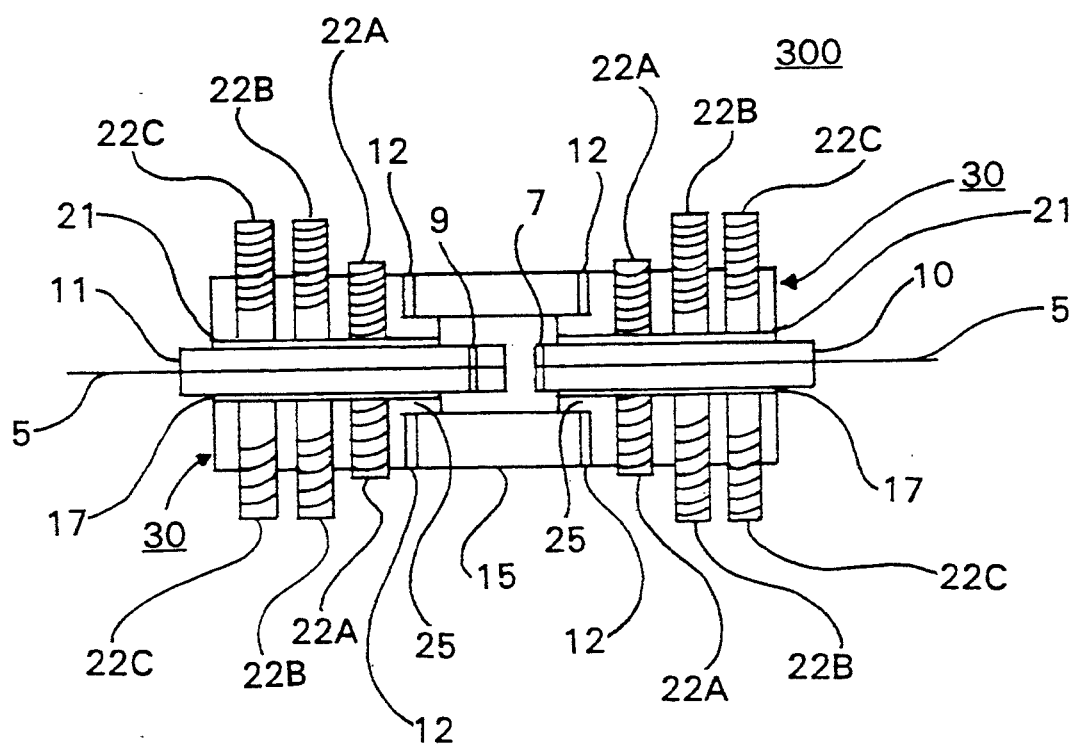
FIG. 5 is a schematic cross-sectional view of the FFP of FIG. 4.

FIG. 5 is a schematic cross-sectional view of the FFP 300. The ferrule holders 30 of FFP 300 are bonded to ends of a single cylindrical PZT as in FFP 200. The holder has a passageway (21) and flange (15) as does holder 20. The ferrule assembly in the filter is the same as that in FFP 200 and sleeves (17) are inserted into the holder interposed between the screws and the ferrule. Only one set of four screws (22A, 22B or 22C) need be employed at any given time to secure the ferrule in the holder. The points of contact between the ferrule and the body of the holder are adjusted by tightening or loosening the entire set of screws. Alignment of the ferrule is adjusted by varying the relative tightness of the screws in one set. Once the temperature coefficient of a given filter is adjusted by selection of a set of screws in each holder, the remaining screws in other sets need not be retained in the holder. Two or more sets of screws in each holder may be employed to secure the ferrule in the holder. To avoid ferule breakage it is preferred that only one set of screws in each holder be employed to secure a ferrule.

Figure 6:
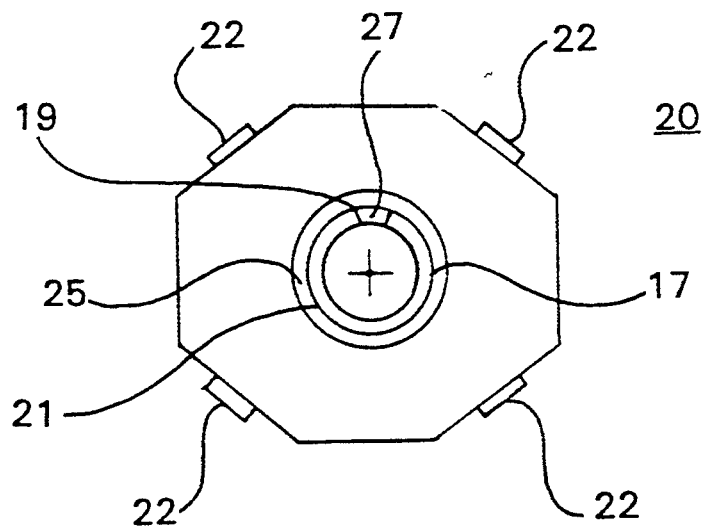
FIG. 6 is a schematic view of the internal end of a ferrule holder of this invention with slotted sleeve in place such that the keyway of the holder is engaged in the slot in the sleeve. The flange which extends outward from the holder body around the holder passageway is indicated.

FIG. 6 is a schematic view of the internal end of a ferrule holder 20 of this invention. The internal end of the holder 30 is the same as that of holder 20. This view shows a keyway (27) which extends the length of the holder passageway. The sleeve (17) is slotted along its length so that the when the sleeve is in place in the passageway the keyway of the holder is engaged in the slot in the sleeve. The flange (25) is shown extending outward from the holder body around the holder passageway (21).

Figure 7:
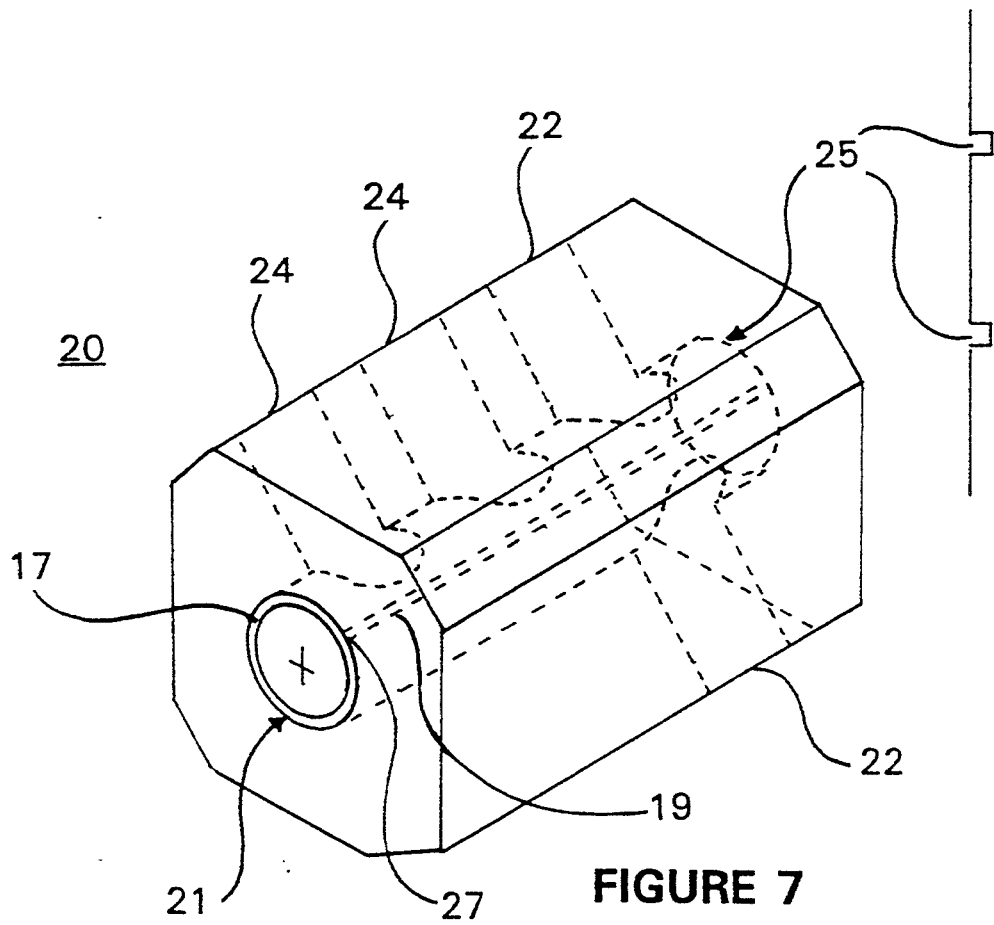
FIG. 7 is a perspective view of a ferrule holder of this invention indicating the passageway through the holder and the keyway along that passageway. The slotted sleeve is shown in place.

FIG. 7 is a perspective view of ferrule holder 20 of this invention indicating the passageway (21) through the holder and the keyway (27) along the passageway (21). The slotted sleeve (17) is shown in place with its slot (19) engaged in the keyway (27).

The screws 24 and 22 in FFPs 200 and 300 are preferably sealer with a silicon thread sealer to keep moisture out of the FFP. Screws employed are typically made of the same material as the holder, preferably stainless steel. Screws with cupped-ends which tightly grip the surface against which they are tightened are preferably employed for alignment, as for screws 22A–22C in FFP 300. Screws with flat ends are preferably employed as screws 24 in 200 for creating contact points along the length of the holder passageway.

Figure 8:
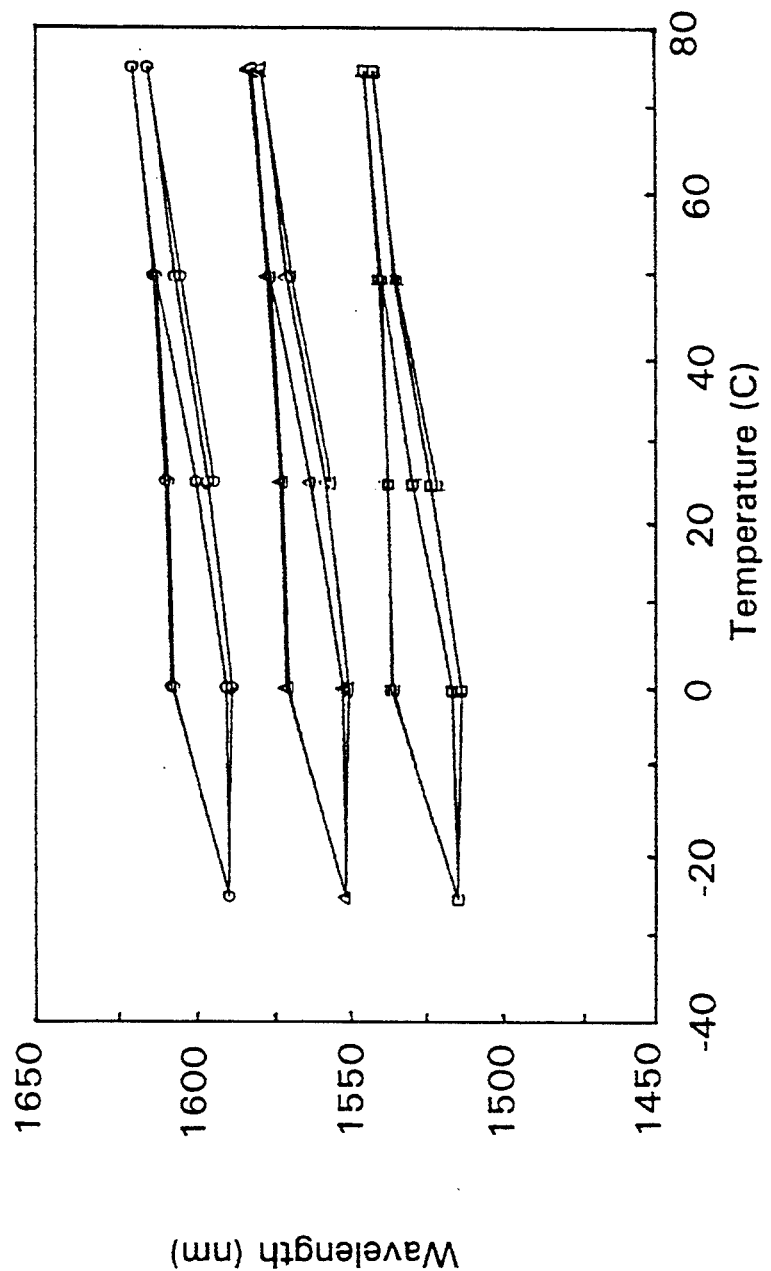
FIG. 8 is a graph of wavelength vs. temperature for an FFP of this invention.
Figure 9:
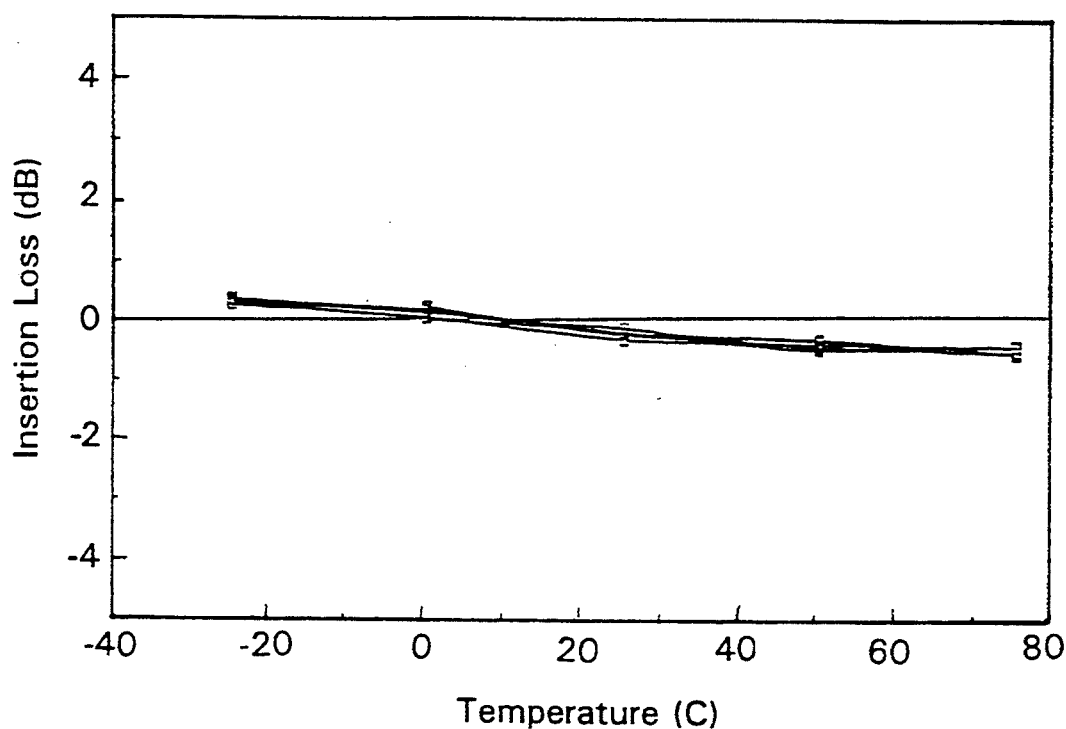
FIG. 9 is a graph of insertion loss vs. temperature for an FFP of this invention.
Figure 10:
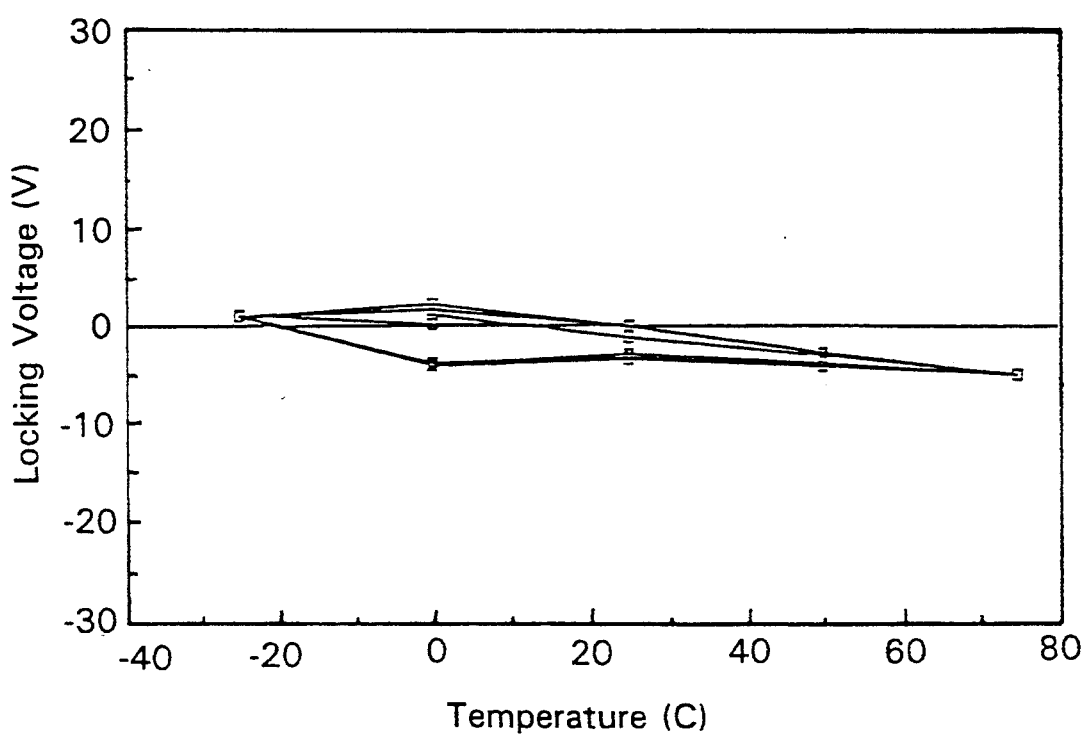
FIG. 10 is a graph of locking voltage vs. temperature for an FFP of this invention.

FIGS. 8–10 are graphs illustrating the performance of a miniaturized filter of design 200.

FIG. 8 shows the variation in wavelength (at three different wavelengths) as a function of temperature over an approximately 100° C. range. The variations observed are less than 1 FSR/100° C.

FIG. 9 shows the variation of insertional loss for the same miniaturized filter over the same temperature range. The variations observed are less than 1 dB.

FIG. 10 shows how locking voltage in a wavelength locking circuit must be varied with temperature to maintain a given wavelength for the same miniaturized FFP. Locking voltages of magnitude less than about ±5 volts were required to maintain the desired wavelength over the entire temperature range tested. Standard wavelength locking techniques were employed.

Filters like 200 and 300, in FIGS. 2 and 5 respectively, are constructed by first determining the amount of positive temperature coefficient adhesive required to balance the negative temperature coefficient of the PZT. This is done in a test filter. The thickness of the adhesive layers between the ends of the PZT and the internal ends of each ferrule holder is controlled using gauge wires, for example. The filter assessed in FIGS. 8–10 had controlled thicknesses of epoxy in the bonds attaching the PZTs to the holders. Epoxy layers were controlled by use of steel gauge wire spacers inserted between the surfaces to be bonded. The filter assessed in FIGS. 8–10 employed a single commercially available cylindrical PZT (10 mm long with OD about 6.5 mm and having a cylindrical passageway of OD about 0.124 mm). The epoxy thicknesses in the two bonds affixing the PZT to the support brackets were determined by gauge wires of precise known diameter.

To achieve a low-loss filter, high tolerance alignment of the optical fibers through the filter is required. In an FFP in which the optical cavity comprises a fiber gap, the optical fibers in the two ferrules must be precisely aligned to avoid loss. The ferrule holders of this invention optional provide such means. The alignment of one or both ferrules can be adjusted for example by tightening or loosening the screws within a set of screws positioned equiangularly around the circumference of the holder passageway. The screws are tightened or loosened with respect to each other to achieve maximum signal through the filter.

The temperature compensated FFPs described herein were constructed at normal room temperatures. The empirical balancing of temperature coefficients of the filters described herein was assessed within the expected normal operational temperatures (−25° C.–75° C.) of the filter as indicated in the graphs presented herein, temperature drift was typically assessed by cooling and/or heating the test FFP above room temperature.

The FFPs of this invention employ a piezoelectric transducer means which transforms electrical energy into mechanical energy by utilizing the piezoelectric longitudinal effect. PZTs elongate along one axis on application of an electric field and the elongation is proportional to the applied field. Electrostrictive materials which elongate on application of a field, but in which the elongation is proportional to the square of the applied field can also be employed in the FFPs of this invention to vary cavity length. Like PZTs, electrostrictive materials will display negative temperature coefficients, the effect of which can be compensated as described herein specifically for PZTs.

The FFPs of the present invention are constructed using controlled thickness of adhesive between the internal ends of the ferrule holders and the ends of the PZT. The methods employed are essentially those described in U.S. Pat. No. 5,289,552. The amount of epoxy in a joint is most easily controlled by controlling the thickness of the epoxy layer over a specified surface area. The specific amount, or thickness, of epoxy required to balance the effect of the PZTs depends most strongly on the temperature coefficient of the epoxy and the size of the PZTs used. The amount of epoxy required will depend to a lesser extent on the other materials used in the filter and generally on the design of the FFP. The ferrule supports are typically made of steel and the ferrules of Pyrex TM or quartz which are all materials having relatively low positive temperature coefficients. The amount of epoxy required to balance the temperature coefficient of a filter will be sensitive to low temperature coefficient materials present in large amounts in the support and fixture or even small amounts of high temperature coefficient materials used in the support and fixture.

The thickness of the epoxy layer required for a particular FFP design, i.e., fixture design, type of ferrules used, the size of PZTs and other materials used in the filter, is determined experimentally. The thickness of the epoxy layers used to bond the PZTs to the support brackets in a test FFP is varied until wavelength drift as a function of temperature is minimized. Preferably, epoxy thicknesses are adjusted in the test filter so that the wavelength drift of the filter is equal to or less than 0.1 FSR/15° C. FFPs of the same design as the test FFP are then constructed using the experimentally determined epoxy thicknesses which gave a minimum temperature drift in the test FFP. The thickness of the epoxy joints in the FFP must also be such that the PZT is substantially rigidly bonded between the ferrule holders.

Non-deformable (i.e., steel) wires of very precise gauge can be employed to control epoxy thickness. Such steel gauge wires are commercially available. To control epoxy thickness, a gauge wire is inserted between the end of the PZT and the bracket to which it is to be bonded. A drop of epoxy is applied in the joint sufficient to cover the entire area of the joint. The area of the joint typically corresponds to the area of the end of the PZT. Uniform pressure is applied across the joint and excess epoxy which is squeezed out of the joint on application of a uniform pressure is removed. A uniform controlled thickness of epoxy results after curing of the epoxy. It has been found that non-deformable steel gauge wires are suitable non-deformable spacers for forming the desired controlled thickness epoxy layers. The size of the gauge wire required to achieve the required epoxy thickness for minimal wavelength drift is determined experimentally in test FFPs. Thereafter the FFPs are constructed employing the experimentally selected diameter gauge wires. It is not necessarily the case that the thicknesses of the epoxy layers is equal to the diameter of the gauge wire. However, the use of the same gauge of wire will give reproducibly controlled thicknesses of epoxy in FFP joints. This method employing experimentally selected steel gauge wires and the application of uniform manual force was found to result in FFPs with substantially reproducible low temperature coefficients. Consistency in manufacture may be further improved by application of uniform mechanical force across the joints, such as by the application of adjustable clamps or like devices. The reproducibility of a method for construction a temperature compensated FFP can be assessed by determining an average temperature coefficient of a number of FFPs prepared employing that method.

The type of epoxy used is selected such that a layer that is thick enough to balance the negative temperature coefficient of the PZTs is thick enough to provide a good bond.

In general, any means for obtaining a controlled thickness of adhesive (or a controlled amount of adhesive) in a joint can be employed in the construction of temperature compensated filters of this invention. For example, the face of the holder to which the PZT will be bonded can be provided with a precisely machined groove for receiving and positioning the PZT. In addition, one or more spacing ridges can be precisely machined on the face of the support bracket to serve as a non-deformable spacer for generating an epoxy joint of uniform thickness.

The FFPs of this invention can employ any type of fiber ferrule that is useful in an FFP. The FFPs herein can combine any means of passive temperature compensation with the means for adjustment of the temperature coefficient that is disclosed herein. The methods for passive temperature compensation described herein can be employed alone or in combination with the methods for adjustment of temperature drift described herein. Similarly, the methods and ferrule holders described herein for temperature coefficient adjustment in an FFP can be employed in the absence of passive temperature compensation, such as the use of aluminum blocks and/or controlled epoxy layers. It is most preferred in order to minimize drift and maximize production yield, to combine passive controlled epoxy layer means and adjustable means described herein. The temperature compensated FFPS of this invention can be employed in combination with wavelocking circuity as is know in the art.

Details of construction of FFPs, the preparation of ferrules including wafered ferrules, the deposition of mirrors and techniques for alignment of ferrules are known in the art or have been described variously in U.S. Pat. Nos. 5,212,745, 5,212,746, and 5,062,684, all of which are incorporated by reference, in their entirety, herein. FFP mirrors have typically been produced by deposition of multiple layers of quarter-wavelength stacks of $Si/SiO_2$. Improved Low-loss FFPs can be produced by use of mirrors formed by deposition of multiple layers of $TiO_2/SiO_2$, as described in J. Stone and L. W. Stulz (1991) Electronics Letts. 27(24):2239–40.

The terms "precision", "precisely controlled" and "to high tolerance" as employed herein as used with in reference to alignment fixtures, spacers and machining and refer to machining to a minimum precision of about 0.0001 inch (1/10 mil).

The term optical as used in "optical fiber", "optical cavity" or "optical transmission", herein, refers to electromagnetic radiation having a wavelength such that the radiation can be transmitted by means of dielectric fibers with loss less than 25 db/Km. Presently, wavelengths in the range of 400 to 2,000 nm can be transmitted by optical fibers. The term "optically continuous" refers to optical fibers through which an optical signal can be transmitted. An optically continuous fiber may contain fiber ends or small fiber gaps so long as an optical signal can traverse the fiber. While FFPs have typically been employed for communications applications, with appropriate choice of materials FFPs can be employed of filtering of wavelengths other than those used in communication.

The PZTs employed in this invention have a cylindrical passageway extending along this elongation axis. The optical cavity of the FFP is formed within the passageway of the PZT between the mirrors of two ferrules inserted therein. The use of such PZTs minimizes the height and width of the FFP and greatly facilitates its use in confined spaces such as on circuit boards. With commercially available PZTs, and ferrule material, FFPs of this invention suitable for circuit board use can be constructed that are about 6.8 mm high, about 10 mm wide and about 30 mm long. These miniaturized FFPs can be mounted onto such circuit boards in foam holders, for example neoprene holders, which mechanically isolate the FFP from its surroundings, yet allow desired longitudinal expansion of the PZT and exert no forces which might disrupt alignment of the optical fibers of the FFP. The foam holder comprises a cavity sized to fit, hold and thereby mechanically isolate the FFP. The foam holder containing the FFP is mounted on the circuit board and the PZT leads can then be soldered to the circuit board connections. Miniaturized FFPs are useful in any application where the size of a device is a concern. Miniaturized FFPS are particularly attractive for applications which require the use of multiple FFPs, for example in multichannel selection, to minimize device size.

The FFPs of this invention are tunable by application of an electric field to the PZT. A tunable FFP is a filter in which the wavelength or frequency of the transmission output of the filter is changed, shifted or tuned by changing the optical path length of the resonance cavity of the FFP. In contrast a fixed FFP is intended to transmit a fixed wavelength (or frequency) and to be operated at a substantially constant optical cavity length between the mirrors. In some fixed FFP applications, it may be desirable that the FFP be capable of small cavity length changes, for example to adjust to small source fluctuations. A filter that is tunable over a small range, e.g., less than 30% of an FSR is a narrowly tunable or trimable FFP. FFPs of this invention can be employed in applications requiring either tunable or trimable fixed FFPs.

As will be appreciated by those in the art, chromatic dispersion, waveguide dispersion, inaccuracies in spectrum analysis, and errors in measurement can add to the measured variation in FSR as a function of wavelength. Methods for the minimization of such dispersion effects and inaccuracies are well-known in the art. It is also well-known in the art that the wavelength range over which a FFP is operable (operable wavelength range) is limited by the wavelength dependence of the mirrors employed.

One of ordinary skill in the art will appreciate that the configurations, materials and techniques specifically described and exemplified herein can be modified, altered or adapted to achieve the objectives of this invention. All such alterations and modifications that embody the principles of this invention are encompassed within the spirit and scope of this invention.

I claim:

1. A temperature compensated fiber Fabry-Perot filter which comprises:

a fiber ferrule assembly having an optical resonance cavity therein which comprises a first and a second ferrule element each of which has a substantially axial bore therethrough for receiving an optical fiber and a mirror transverse to said axial bore and each of which ferrules has an internal end said ferrules positioned with respect to each other such that the internal ends of said ferrules are opposed and an optical resonance cavity is formed between opposing reflective surfaces of said mirrors;

sleeve means positioned around the circumference of each of said ferrules;

a support means for holding said ferrules and said sleeves such that the length of said optical cavity can be changed which comprises a first and a second ferrule holder each of which holders has an internal end and a piezoelectric transducer means for electronically changing the length of said optical cavity interposed between the internal ends of said first and second holders such that the distance between said holders can be changed whereby the optical cavity length is changed;

each of said holders having an essentially cylindrical passageway therethrough for receiving said ferrule and sleeve, and a plurality of adjustable means along the length of said passageway for contacting said sleeve which in turn contacts said ferrule thereby securing said ferrule within said passageway.

2. The filter of claim 1 wherein the optical fiber of said optical cavity comprises a fiber gap and said support means functions to hold the optical fibers of said ferrules in axial alignment such that the length of said optical cavity can be changed by application of an appropriate voltage to said piezoelectric transducer means without substantial change to said fiber alignment.

3. The filter of claim 2 wherein said piezoelectric transducer means comprises a piezoelectric transducer element interposed between said ferrule holders such that selective application of a voltage to said transducer changes the optical cavity length without substantially changing the alignment of the optical fibers of said ferrules.

4. The filter of claim 3 wherein said piezoelectric transducer element has a first and a second end and a longitudinal axis along which it expands between said ends and comprises a cylindrical passageway along said expanding axis for receiving the internal ends of said ferrules.

5. The filter of claim 4 wherein the first end of said piezoelectric transducer element is rigidly attached to the internal end of said first holder and said second end of said piezoelectric transducer element is rigidly attached to the internal end of said second ferrule holder whereby said piezoelectric transducer element is interposed between said ferrule holder means.

6. The filter of claim 5 wherein the ends of said holder are attached to the ends of said transducer element employing a controlled thickness of a positive temperature coefficient adhesive.

7. The filter of claim 6 wherein said adhesive is an epoxy and said epoxy thickness is controlled by insertion of a non-deformable gauge wire between the transducer end and the holder end to which it is to be attached.

8. The filter of claim 6 wherein the internal end of each of said holders comprises a flange extending outwardly from the body of the holder around the circumference of the passageway such that adhesive used in the connection between the ends of the holder and the transducer does not contact the ferrules or enter the optical cavity of the filter.

9. The filter of claim 6 wherein said sleeve substantially extends the length of said ferrule within the passageway of said holder such that the adjustable means for securing the ferrule in said holder passageway contact said sleeve and thereby secure said ferrule therein.

10. The filter of claim 9 wherein said essentially cylindrical passageway in said holder comprises a keyway along its axial length and said sleeve comprises a slot for receiving said keyway along its axial length such that when said sleeve is positioned in said passageway and said keyway is aligned within said slot the sleeve cannot rotate within said passageway.

11. The filter of claim 6 wherein said sleeve is made of a material which has a positive temperature coefficient larger than that of the material of which the holder is made.

12. The filter of claim 11 wherein said sleeve is phosphor bronze.

13. The filter of claim 12 wherein the ferrule holders and the means therein for securing the ferrule within the holder are made of stainless steel.

14. The filter of claim 6 wherein said means for securing said ferrule within said holder also function as an adjustable means for changing the cavity length temperature coefficient of said filter.

15. The filter of claim 14 wherein said means for securing said ferrule within said holder also function as an adjustable means for changing the axial alignment of said optical fibers in said filter.

16. The filter of claim 15 wherein said means of securing said ferrules within said holder comprise a plurality of screws which extend through the body of said holder into the passageway of said holder and which can be independently adjusted by turning to extend through the body of said holder into said passageway rigidly contacting said sleeve which in turn rigidly contacts said ferrule.

17. The filter of claim 16 wherein said independently adjustable screws are positioned along the length of said passageway and extend into said passageway from the same direction.

18. The filter of claim 15 wherein said means for securing said ferrules in said holder comprise one or more sets of screws wherein each set of screws is positioned in said holder such that they can extend upon turning into said passageway at the same position along the length of the passageway axis and are equiangularly distributed around the circumference of said passageway and wherein each set of screws enter the passageway at a different position along said passageway axis.

19. The filter of claim 18 wherein each set of screws contains four screws.

20. The filter of claim 18 wherein said screws have flat ends.

21. The filter of claim 15 wherein said means for securing said ferrules in said holder comprise one set of screws equiangularly distributed around the circumference of said passageway which function to change the alignment of said filter and a plurality of screws along the length of said passageway which extend into said passageway from the same direction which function to allow adjustment of the cavity length temperature coefficient of said filter.

22. The filter of claim 21 in which said set of screws contains four screws and wherein two or more additional screws are positioned along the length of said passageway.

23. The filter of claim 22 wherein the screws of said set of screws have flat ends and said additional screws along the length of said passageway have cupped ends.

24. The filter of claim 1 wherein said mirrors are formed by depositing layers of $Si/SiO_2$.

25. The filter of claim 1 wherein said mirrors are formed by depositing layers of $TiO_2/SiO_2$.

* * * * *